United States Patent
Mody et al.

(10) Patent No.: US 10,803,651 B2
(45) Date of Patent: Oct. 13, 2020

(54) METHODS AND APPARATUS TO PERFORM GRAPHICS PROCESSING ON COMBINATIONS OF GRAPHIC PROCESSING UNITS AND DIGITAL SIGNAL PROCESSORS

(71) Applicant: Texas Instruments Incorporated, Dallas, TX (US)

(72) Inventors: Mihir Narendra Mody, Bangalore (IN); Ajay Jayaraj, Sugar Land, TX (US); Hemant Hariyani, Plano, TX (US); Anand Balagopalakrishnan, Bangalore (IN); Jason A. T. Jones, Richmond, TX (US); Erick Zadiel Narvaez, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 27 days.

(21) Appl. No.: 16/353,792

(22) Filed: Mar. 14, 2019

(65) Prior Publication Data

US 2020/0294300 A1 Sep. 17, 2020

(51) Int. Cl.
*G06T 15/00* (2011.01)
*G06T 1/60* (2006.01)
*G06T 1/20* (2006.01)

(52) U.S. Cl.
CPC .............. *G06T 15/005* (2013.01); *G06T 1/20* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 2008/0094412 A1* | 4/2008 | Jiao | G06T 1/20 345/621 |
| 2008/0150949 A1* | 6/2008 | Wei | G06T 15/005 345/506 |
| 2017/0116703 A1* | 4/2017 | Sundareson | H04N 7/181 |
| 2017/0132830 A1* | 5/2017 | Ha | G06T 17/20 |

* cited by examiner

*Primary Examiner* — Peter Hoang
(74) *Attorney, Agent, or Firm* — Ebby Abraham; Charles A. Brill; Frank D. Cimino

(57) ABSTRACT

Methods, apparatus, systems and articles of manufacture to perform graphics processing on combinations of graphic processing units and digital signal processors are disclosed. A disclosed example method includes processing first data representing input vertices to create second data, the first data using a first format organized by vertex, the second data using a second format organized by components of the vertices. A digital signal processor (DSP) is to perform vertex shading on the second data to create third data, the third data formatted using the second format, the vertex shading performed by executing a first instruction at the DSP, the first instruction generated based on a second instruction capable of being executed at a graphics processing unit (GPU). The third data is processed to create fourth data, the fourth data formatted using the first format.

20 Claims, 10 Drawing Sheets

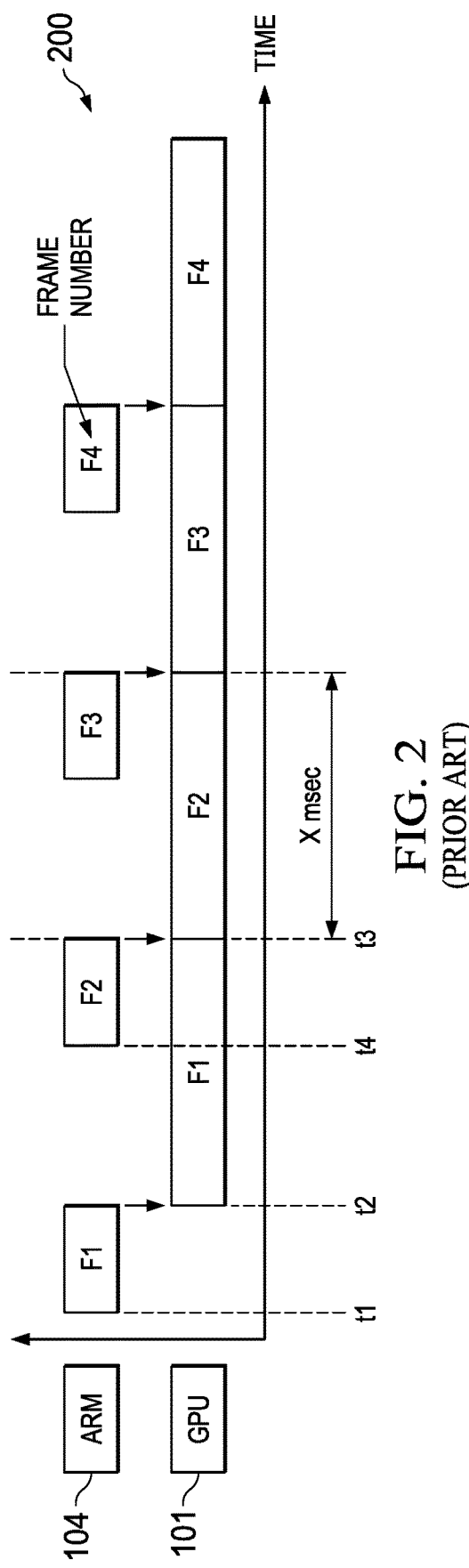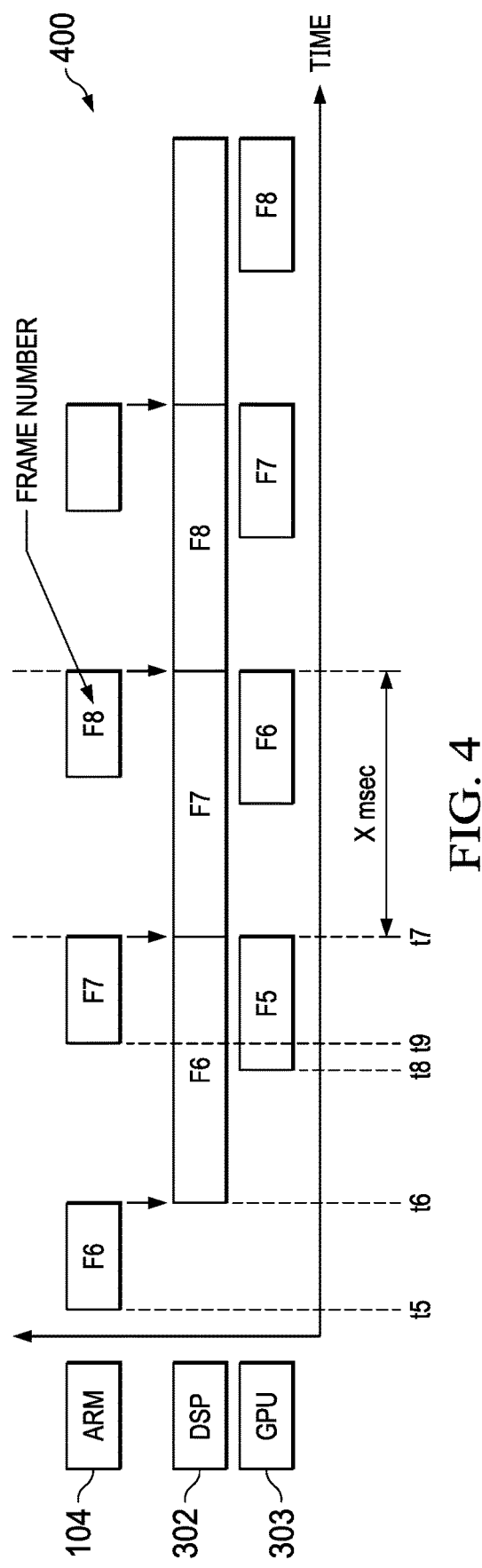

*1400*

| NO | GPU | DSP | TOTAL |
|---|---|---|---|
| 1 | 2x GPU 1 43 GLOPS | 2x DSP 1 16 GFLOP | 59 GFLOPs |
| 2 | 4x GPU 2 300 GFLOP | 2x DSP 2 128 GFLOPS | 428 GFLOPs |

1402 = row 1; 1404 = row 2

| EXAMPLE VERTEX SHADERS | DESCRIPTION | CYCLES PER VERTEX ON DSP 1 | CYCLES PER VERTEX ON GPU 1 |
|---|---|---|---|
| ES2Gears | OpenGL VERSION OF GFX GEAR | 27 | 15 |
| JellyFish | PART OF GIMARK | 364 | 84 |
| CAR MODEL | VERTEX TRANSFORMATION | 8 | 9 |
| SURROUND VIEW | BASIC FLAVOR | 10 | 9 |
| ADAPTIVE BOWL SU | ASSUMES RADIAL SYMMETRY | 209 | 88 |

FIG. 15

METHODS AND APPARATUS TO PERFORM GRAPHICS PROCESSING ON COMBINATIONS OF GRAPHIC PROCESSING UNITS AND DIGITAL SIGNAL PROCESSORS

FIELD OF THE DISCLOSURE

This disclosure relates generally to graphics processing and, more particularly, to methods and apparatus to perform graphics processing functionality on combinations of one or more of a graphics processing unit (GPU) and one or more of a digital signal processor (DSP).

BACKGROUND

GPUs are specialized purpose-built electronic circuits that efficiently perform graphics functionality (e.g., shading, rasterization, image manipulation, etc.). A GPU renders images, animations, video, etc. for display on a screen.

BRIEF DESCRIPTION OF THE DRAWINGS

FIG. 2 is diagram of an example prior art two-stage pipelined configuration for the example graphics processing system of FIG. 1.

FIG. 4 is a diagram of an example three-stage pipelined configuration for the example graphics processing system of FIG. 3.

FIGS. 14 and 15 show example performance gains from using teachings of this disclosure.

Figure 1:
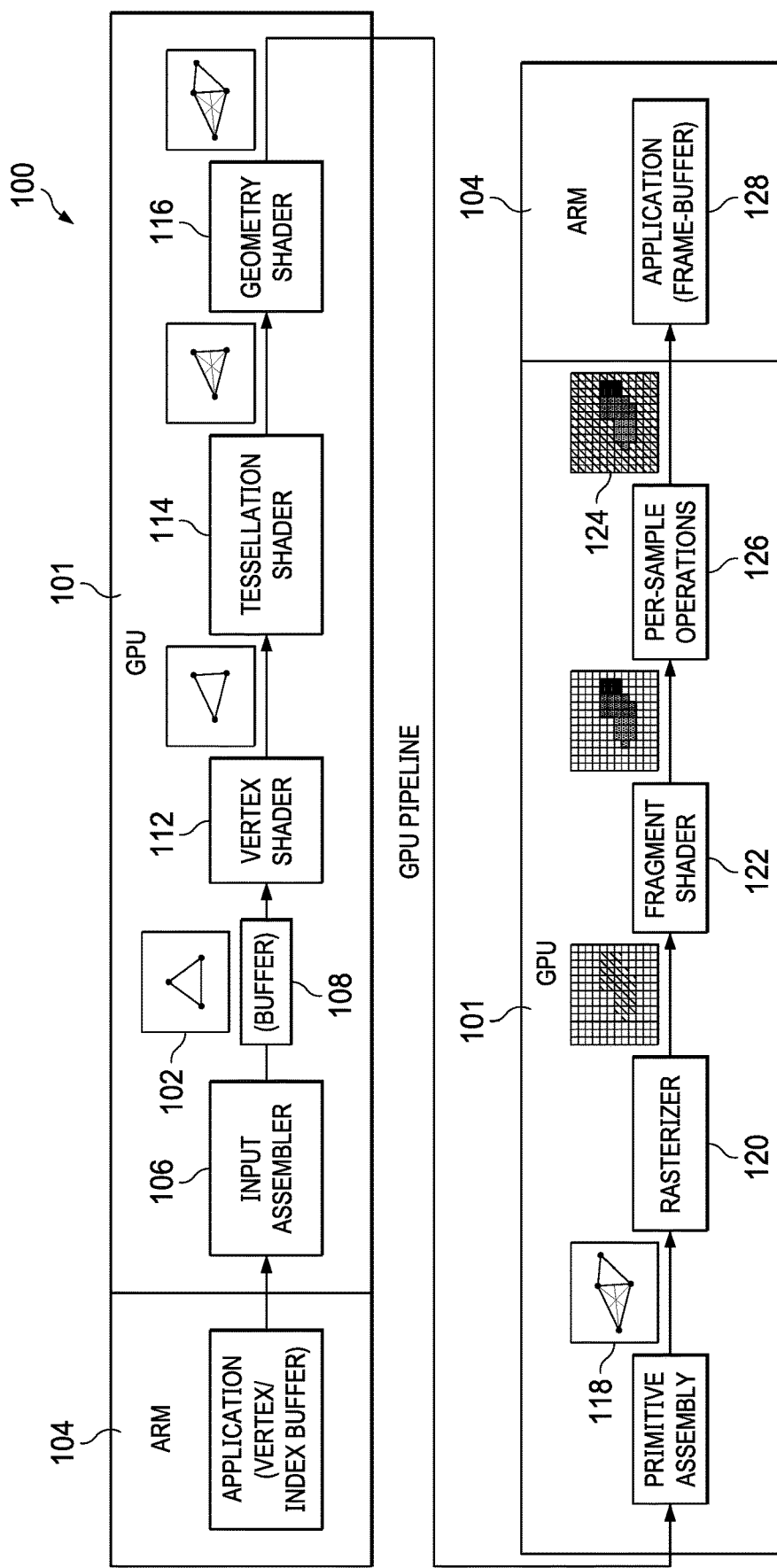
FIG. 1 is diagram of a prior art example graphics processing system.

As beneficial, the same reference numbers will be used in the drawing(s) and accompanying written description to refer to the same or like parts. Connecting lines or connectors shown in the various figures presented are intended to represent example functional relationships and/or physical or logical couplings between the various elements.

DETAILED DESCRIPTION

An example prior art graphics processing system 100 by a GPU 101 is shown in FIG. 1. The example graphics processing system 100 transforms a three-dimensional (3D) scene into a two-dimensional (2D) image that represents the 3D scene from a particular viewpoint and orientation. As used herein, a vertex and/or vertices is a data structure that describes attributes corresponding to a point in 2D and/or 3D space (e.g., a 3D scene). In addition to describing positioning information about the point, a vertex may represent attributes corresponding to that point such as, for example, a color, a reflectance, a texture, etc. Vertices 102 of the 3D scene are transferred from an advanced reduced instruction set computing machine (ARM) processor 104 by an input assembler 106 to a memory 108 of the GPU 101. In the illustrated example, graphics functions (e.g., an example vertex shader 112, an example tessellation shader 114 and an example geometry shader 116) are successively applied to the vertices 102 by the GPU 101. Assembled data 118 generated by the vertex shader 112, the example tessellation shader 114 and the example geometry shader 116 is passed to an example rasterizer 120 for filling in vertex triangles, which are then passed to an example fragment shader 122. Outputs 124 of the fragment shader 122 and per-sample operations 126 are placed in a buffer 128 for display by the ARM processor 104 on a screen.

The graphics processing system 100 shown in FIG. 1 can be efficiently implemented by executing the functions implemented by the ARM processor 104 and the functions implemented by the GPU 101 in a pipelined configuration (e.g., by pipelining the functions, using a processing pipeline, etc.), as shown in FIG. 2. A pipelined configuration is the dividing of functionality into functions whose execution can overlap (e.g., execute wholly or partially in parallel). For example, data transfer and function execution can often be executed simultaneously. A pipeline configuration is divided into stages and these stages are connected with one another to form a pipe like structure. In the illustrated prior art example pipelined configuration of FIG. 2, the ARM processor 104 processes data for a frame F1 during a time period t1-to-t2, the GPU 101 processes data for the frame F1 during a time period t2-to-t3. In parallel with the GPU 101 processing the frame F1, the ARM processor 104 processes data for the next frame F2 during a time period t4-to-t3 that overlaps the time period t2-to-t3. In this way, the ARM processor 104 ensures that data to be processed by the GPU 101 is always ready when the GPU 101 is ready to process the next frame. For example, the ARM processor 104 processes the data for frame F2 prior to the time t3 when the GPU is ready to process the data for frame F2. If the example of FIG. 1 was not pipelined, the ARM processor 104 would not process data for the next frame F2 until the GPU 101 completes processing of the frame F1. In such an example, the processing of the frame F2 by the GPU 101 would be delayed by the time it takes the ARM processor 104 to process the frame F2.

Reference will now be made in detail to non-limiting examples of teachings of this disclosure, some of which are illustrated in the accompanying drawings.

Figure 3:
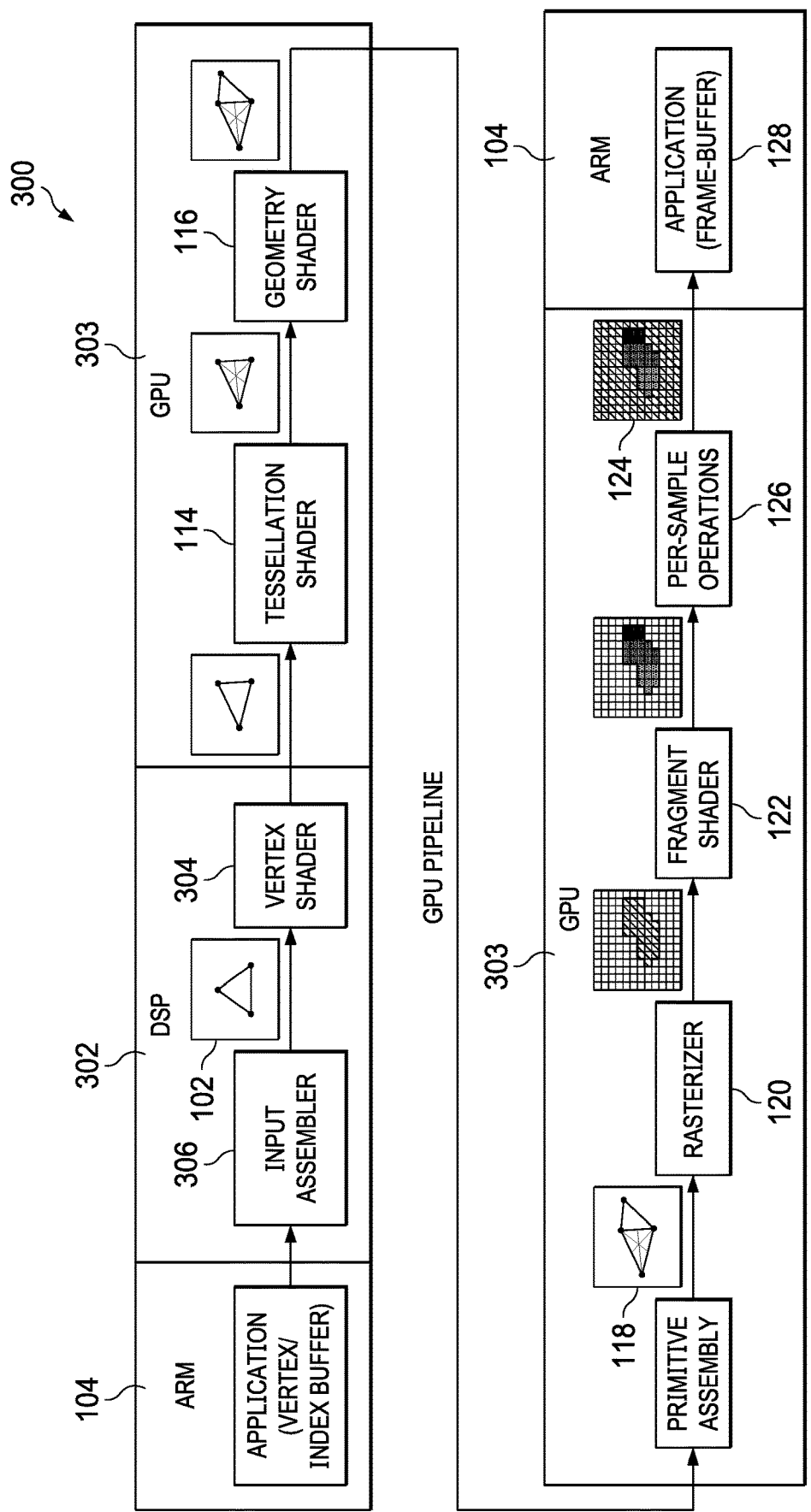
FIG. 3 is a diagram of example graphics processing system including an example combination of a DSP and a GPU in accordance with teachings of this disclosure.

FIG. 3 is a diagram of example graphics processing system 300 including an example combination of a third processor such as an example DSP 302, and a GPU 303 (which may be, in some examples, the GPU 101 of FIG. 1) in accordance with teachings of this disclosure. The example graphics processing system 300 transforms a 3D scene into a 2D image that represents the 3D scene from a particular viewpoint and orientation. The example DSP 302 of FIG. 3 performs some or all of the graphics functions that would normally be executed by the GPU 303 such as an example vertex shader 304. In some examples, the example graphics processing system 300 of FIG. 3 is part of an application for an automobile, but may implement graphics processing for other application (e.g., games, video, movies, etc.). As will be discussed below in connection with FIGS. 11-13, the vertex shader 304 is performed using software capable of being executed by a GPU that is converted to executable machine-readable instructions for execution by the DSP. For example, source code may be written in a human readable language, and can then be converted from source code to an intermediate form and/or then compiled for execution by the DSP. In some examples, the software may be capable of being executed at the GPU. Software capable of being executed by a GPU can likewise be converted and executed by the DSP 302. Other graphics functions (tessellation shading, geometry shading, rasterization, fragment shader, per-sample operations, etc.) may be additionally, and/or alternatively, be implemented by the DSP 302.

Like the graphics processing system 100 of FIG. 1, the example graphics processing system 300 of FIG. 3 can be efficiently implemented using a pipelined configuration (e.g., pipelining) of the functions of the ARM processor 104, the DSP 302 and the GPU 303, as shown in FIG. 4. In the illustrated example pipelined configuration 400 of FIG. 4, the ARM processor 104 processes data for a frame F6 during a time period t5-to-t6, the DSP 302 process the frame F6 during a time period t6-to-t7, and the GPU 303 processes frame F5 during a time period t8-to-t7. The ARM processor 104 processes data for the next frame F7 during a time period t9-to-t7 that overlaps the time period t8-to-t9 when the GPU 303 processes the frame F5.

As shown in FIG. 4, graphics processing by the DSP 302 and the GPU 303 can be overlapped in the pipelined configuration 400. For example, by having the DSP 302 process the frame F6 while the GPU 303 processes the preceding frame F5. The DSP 302 can process frame F6 at the same time as the GPU 303 processes the preceding frame F5 because the DSP 302 will be done with frame F6 before or at the same time the GPU 303 is ready to process frame F6. Further overlaps are possible depending on how long various graphics functions take to execute. In general, the arrangement (e.g., amount of overlapping) of functions depends on memory constraints and the time to compute the functions by the various hardware.

While an example graphics processing system 300 is illustrated in FIG. 3, one or more of the elements, processes and/or devices illustrated in FIG. 3 may be combined, divided, re-arranged, omitted, eliminated and/or implemented in any other way. Further, the example ARM 104, the example DSP 302, the example GPU 303, the example vertex shader 304, the example input assembler 306, the example tessellation shader 114, the example geometry shader 116, the example rasterizer, the example fragment shader 122, the example per-sample operations 126 and/or, more generally, the example graphics processing system 300 of FIG. 3 may be implemented by hardware, software, firmware and/or any combination of hardware, software and/or firmware. Thus, for example, any of the example ARM 104, the example DSP 302, the example GPU 303, the example vertex shader 304, the example input assembler 306, the example tessellation shader 114, the example geometry shader 116, the example rasterizer, the example fragment shader 122, the example per-sample operations 126 and/or, more generally, the example graphics processing system 300 could be implemented by one or more analog or digital circuit(s), logic circuits, programmable processor(s), programmable controller(s), GPU(s), DSP(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example ARM 104, the example DSP 302, the example GPU 303, the example vertex shader 304, the example input assembler 306, the example tessellation shader 114, the example geometry shader 116, the example rasterizer, the example fragment shader 122, the example per-sample operations 126 and/or the example graphics processing system 300 is/are hereby expressly defined to include a non-transitory computer-readable storage device or storage disk such as a memory, a digital versatile disk (DVD), a compact disc (CD), a Blu-ray disk, etc. including the software and/or firmware. Further still, the example graphics processing system 300 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Many graphics applications are written using well-defined application programming interfaces (APIs) like OpenGL, Vulkan, etc. Such existing APIs are not readily off loadable onto non-GPU processors such as DSPs. Therefore, there is a need for software compatibility between a GPU and a DSP to allow the DSP to implement graphics functionality normally reserved for implementation by a GPU. Such compatibility is especially useful to those using pipelined configurations, developing applications for which pipelining is use/beneficial as they allow a GPU to be offloaded with a DSP.

Figure 5:
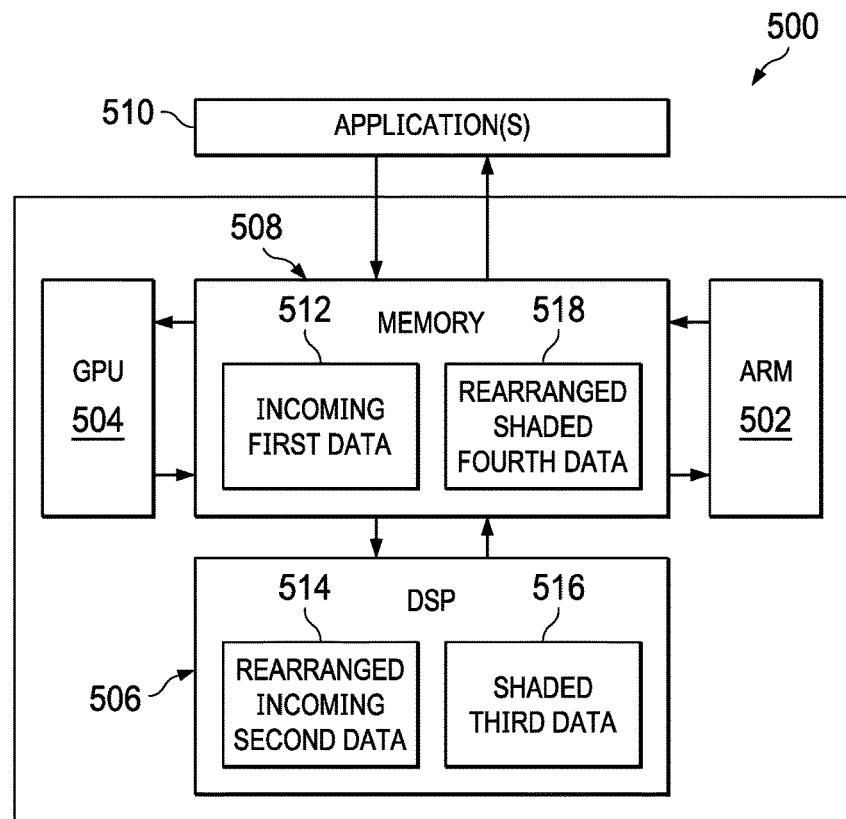
FIG. 5 is a block diagram of an example graphics processing system having a GPU and a DSP in accordance with teachings of this disclosure.

FIG. 5 is a block diagram of an example graphics processing system 500 having any example ARM processor 502, one or more of any type(s) of GPUs 504, one or more of any type(s) of DSPs 506, and one or more of any type(s) of memories 508. The example ARM processor(s) 502, the example GPU(s) 504 and the example DSP(s) 506 perform graphics functions on data provided by one or more application(s) 510, and provide the processed data to the application(s) 510 for display. The graphics functions performed by the ARM processor(s) 502, the GPU(s) 504 and the DSP(s) 506 can be performed using a pipeline configuration such as that described above in connection with FIGS. 3 and 4. In some examples, the ARM processor(s) 502, the GPU(s) 504, the DSP(s) 506 and the memory(-ies) 508 are discrete components. Additionally, and/or alternatively, one or more of ARM processor(s) 502, the GPU(s) 504, the DSP(s) 506 and the memory(-ies) 508 are integrated together in a system on a chip (SoC) integrated circuit.

In the illustrated example of FIG. 5, incoming first data 512 (e.g., representing input vertices) received from the application(s) 510 are stored in the example memory 508 according to an example first format. In some examples, the incoming first data 512 is written into the memory 508 by the application(s) 510. Additionally, and/or alternatively, ARM processor 502 can write the incoming first data 512 into the memory 508.

Figure 6:
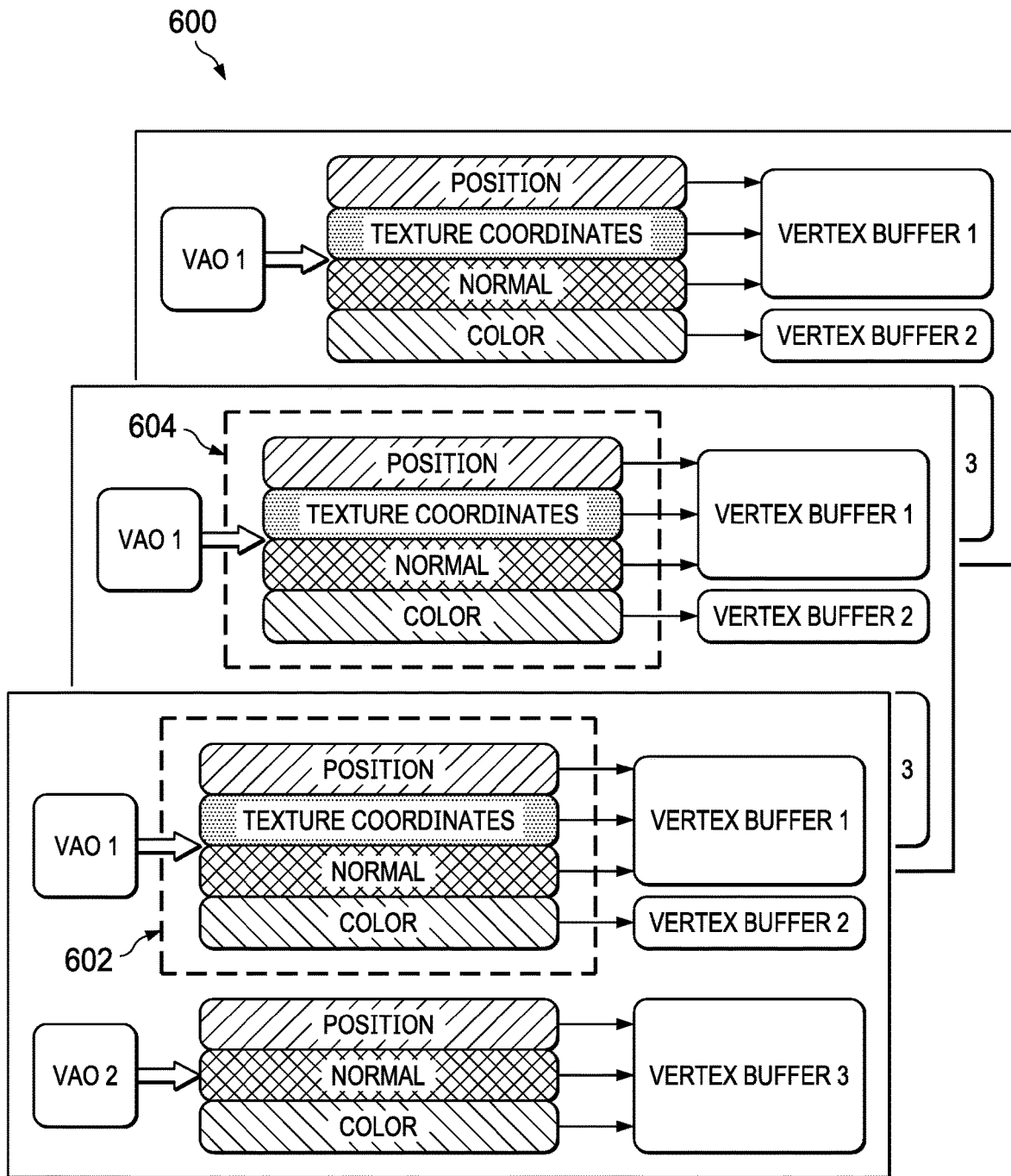
FIG. 6 is a diagram of an example format for storing graphics data according to teachings of this disclosure.

FIG. 6 illustrates an example first format 600 in which the data is organized based on vertices (e.g., grouped such that data for a single vertex remains together). As noted above, a vertex is a data structure that describes attributes corresponding to a point in 2D and/or 3D space (e.g., a 3D scene). In addition to describing positioning information about the point, a vertex may represent attributes corresponding to that point such as, for example, a color, a reflectance, a texture, etc. In the illustrated example of FIG. 6, first attributes 602 of a first vertex are stored together in the memory 508, followed by second attributes 604 of a second vertex. That is, vertex attributes are stored in connection with their corresponding vertex. Example attributes include components, position, texture coordinates, normal vector, color, etc.

The example DSP 506 (e.g., the input assembler 306 of FIG. 3) rearranges the incoming first data 512 into rearranged incoming second data 514 stored in the DSP 506 according to a second format.

Figure 7:
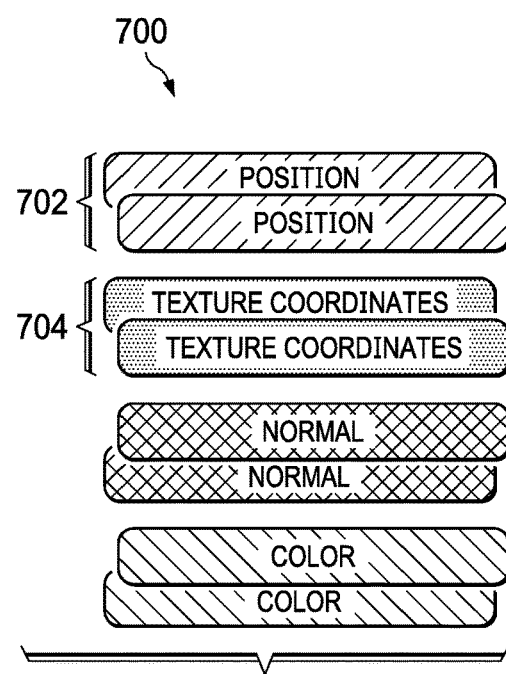
FIG. 7 is a diagram of another example format for storing graphics data according to teachings of this disclosure.

FIG. 7 illustrates an example second format 700 in which data is organized based on components (e.g., attributes) of vertices. For example, first attributes 702 (e.g., components) of a group of vertices are stored together, followed by second attributes 704 of the group of vertices stored together, etc. As a result, information concerning a single vertex is distributed throughout the format, as opposed to being stored in a single element (e.g., as shown in FIG. 6). In some examples, one or more direct memory access (DMA) channels of the DSP 506 move and rearrange (e.g., from the first format 600 to the second format 700) the incoming first data 512 to the rearranged incoming second data 514 in the DSP 506. Using DMA allows the incoming first data 512 of one frame to be rearranged and moved to the DSP 506 in parallel (e.g., in a pipelined configuration) with processing of the rearranged incoming second data 514 of another frame. In some examples, the number of input vertices in a block of the rearranged incoming second data moved into the DSP 506 depends on an amount of memory available on the DSP 506.

The example DSP 506 performs vertex shading (e.g., via the example vertex shader 304) on the rearranged incoming second data 514 to form in the DSP 506 shaded third data 516 arranged according to the second format 700. The example DSP 506 rearranges (e.g., from the second format 700 to the first format 600) the shaded third data 516 into rearranged shaded fourth data 518 stored according to the first format in the memory 508. In some examples, DMA of the DSP 506 rearranges and moves the shaded third data 516 to the rearranged shaded fourth data 518. Using DMA allows the shaded third data 516 of one frame to be rearranged and moved to the memory 508 in parallel with processing of the rearranged shaded fourth data 518 of another frame.

The example GPU 504 performs further graphics processing functions on the rearranged shaded fourth data 518 (e.g., the example tessellation shader 114, the example geometry shader 116, the example rasterizer, the example fragment shader 122, the example per-sample operations 126 of FIG. 3).

The graphics functions performed by the ARM processor 502, the GPUs 504 and the DSPs 506 of FIG. 5 can be performed using a pipelined configuration such as the example pipelined configuration 400 described above in connection with FIGS. 3 and 4.

While an example graphics processing system 500 is illustrated in FIG. 5, one or more of the elements, processes and/or devices illustrated in FIG. 5 may be combined, divided, re-arranged, omitted, eliminated and/or implemented in any other way. Further, the example ARM processor(s) 502, the example GPU(s) 504, the example DSP(s) 506, the example memory(-ies) 508, the example application(s) 510 and/or, more generally, the example graphics processing system 500 of FIG. 5 may be implemented by hardware, software, firmware and/or any combination of hardware, software and/or firmware. Thus, for example, any of the example ARM processor(s) 502, the example GPU(s) 504, the example DSP(s) 506, the example memory(-ies) 508, the example application(s) 510 and/or, more generally, the example graphics processing system 500 of FIG. 5 could be implemented by one or more analog or digital circuit(s), logic circuits, programmable processor(s), programmable controller(s), GPU(s), DSP(s), ASIC(s), PLD(s) and/or FPLD(s). When reading any of the apparatus or system claims of this patent to cover a purely software and/or firmware implementation, at least one of the example ARM processor(s) 502, the example GPU(s) 504, the example DSP(s) 506, the example memory(-ies) 508, the example application(s) 510 and/or the example graphics processing system 500 of FIG. 5 is/are hereby expressly defined to include a non-transitory computer-readable storage device or storage disk such as a memory, a DVD, a CD, a Blu-ray disk, etc. including the software and/or firmware. Further still, the example graphics processing system 500 of FIG. 5 may include one or more elements, processes and/or devices in addition to, or instead of, those illustrated in FIG. 5, and/or may include more than one of any or all of the illustrated elements, processes and devices.

Figure 8:
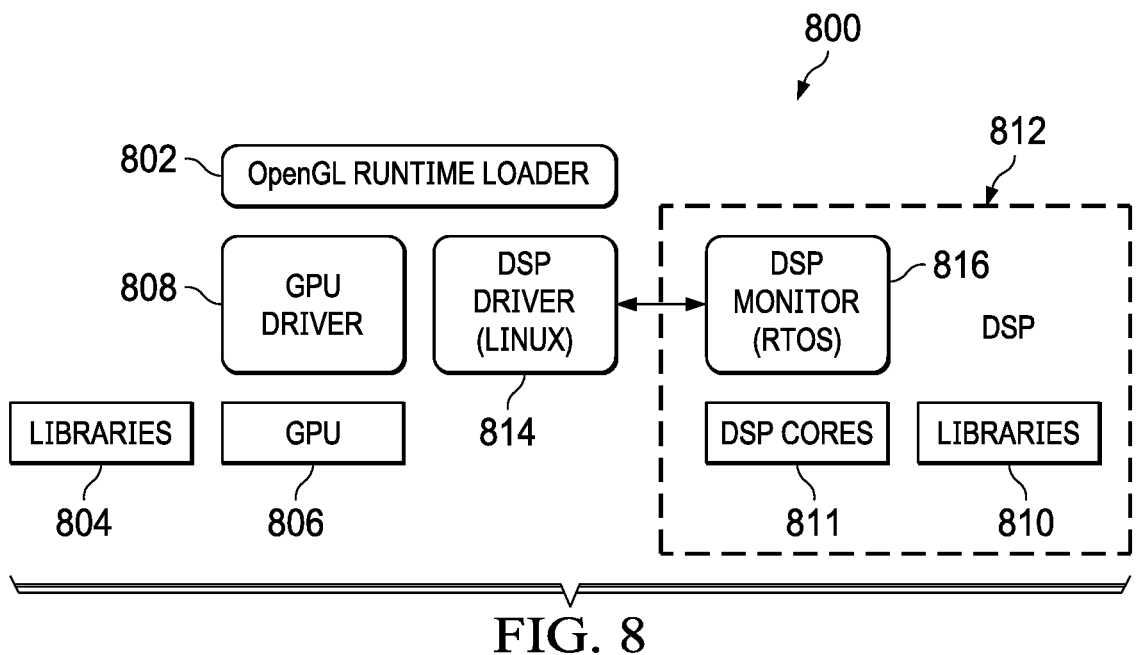
FIG. 8 is a block diagram of an example Open Graphics Library (OpenGL) framework for the example graphics processing system of FIG. 5.

FIG. 8 is a block diagram of an example OpenGL framework 800 for the example graphics processing system 500 of FIG. 5. At runtime, an example runtime loader 802 locates GPU library(-ies) 804 that are to be executed by an example GPU 806, and loads the GPU library(-ies) 804 to the GPU 806 via an example GPU driver 808. Likewise, the runtime loader 802 locates DSP library(-ies) 810 that are to be executed by one or more example DSP cores 811 of an example DSP 812, and loads the DSP library(-ies) 810 to the DSP 812 via an example DSP driver 814. In some examples, the DSP driver 814 is based on a Linux operating system. In some examples, the DSP driver 814 loads the DSP library(-ies) 810 onto the DSP 812 via a real-time operating system (RTOS) 816 executing on the DSP 812. Because, the GPU libraries 804 and the DSP libraries 810 are dynamically loaded at runtime, the offloading of graphics functionality onto the DSP can be dynamically configured and performed.

While an example OpenGL framework 800 is illustrated in FIG. 8, one or more of the elements, processes and/or devices illustrated in FIG. 8 may be combined, divided, re-arranged, omitted, eliminated and/or implemented in any other way. Further, the example OpenGL runtime loader 802, the example GPU libraries 804, the example DSP libraries 810, the example GPU 806, the example GPU driver 808, the DSP 812, the example DSP driver 814, the example RTOS 816 and/or, more generally, the example OpenGL framework 800 of FIG. 8 may be implemented by hardware, software, firmware and/or any combination of hardware, software and/or firmware. Thus, for example, any of the example OpenGL runtime loader 802, the example GPU libraries 804, the example DSP libraries 810, the example GPU 806, the example GPU driver 808, the DSP 812, the example DSP driver 814, the example RTOS 816 and/or, more generally, the example OpenGL framework 800 could be implemented by one or more analog or digital circuit(s), logic circuits, programmable processor(s), programmable controller(s), GPU(s), DSP(s), ASIC(s), PLD(s) and/or FPLD(s). When reading any of the apparatus or system claims of this patent to cover a purely software and/or firmware implementation, at least one of the OpenGL runtime loader 802, the example GPU libraries 804, the example DSP libraries 810, the example GPU 806, the example GPU driver 808, the DSP 812, the example DSP driver 814, the example RTOS 816 and/or the example OpenGL framework 800 is/are hereby expressly defined to include a non-transitory computer-readable storage device or storage disk such as a memory, a DVD, a CD, a Blu-ray disk, etc. including the software and/or firmware. Further still, the example OpenGL framework 800 of FIG. 8 may include one or more elements, processes and/or devices in addition to, or instead of, those illustrated in FIG. 8, and/or may include more than one of any or all of the illustrated elements, processes and devices.

Figure 9:
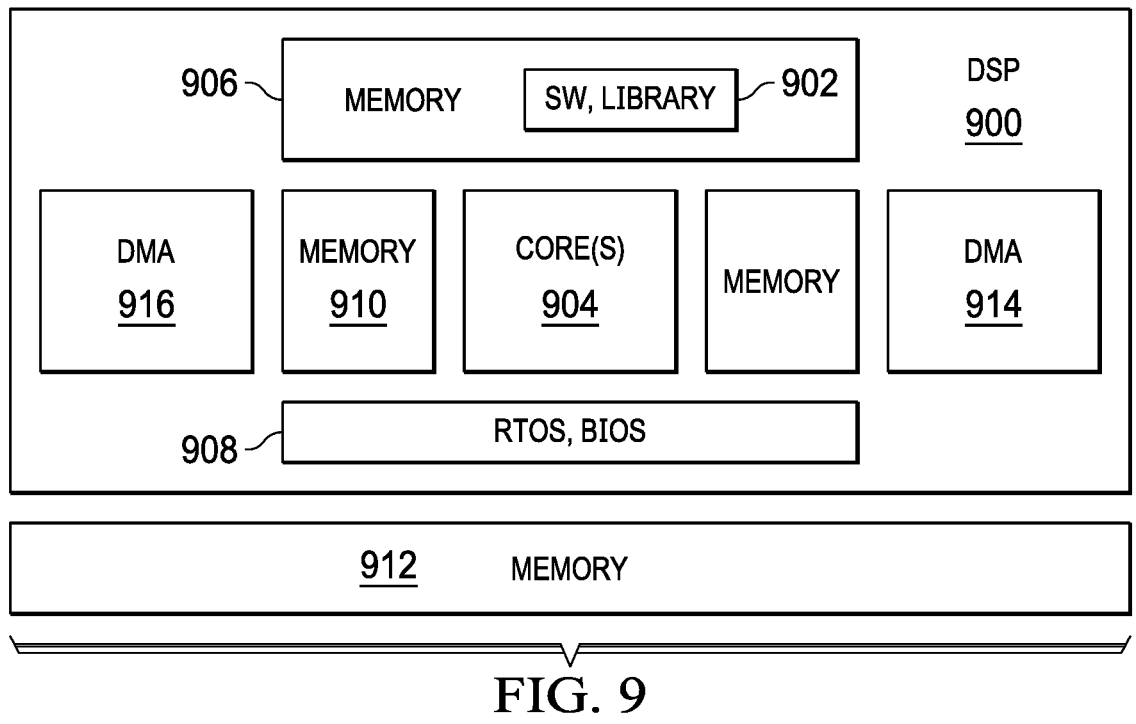
FIG. 9 is a block diagram of an example DSP that may be used to implement the example DSPs of FIG. 3, FIG. 5 and FIG. 8.

FIG. 9 is a block diagram of an example DSP 900 that may be used to implement the example DSP 302 of FIG. 3, the example DSP 506 of FIG. 5 and/or the example DSP 812 of FIG. 8. To execute executable machine-readable instructions 902, the example DSP 900 includes any number and/or type(s) of DSP cores 904, such as those manufactured by Texas Instruments Incorporated, the Assignee of this application, and memory 906 to store the executable machine-readable instructions 902. In some examples, the DSP core(s) 904 are single instruction multiple data (SIMD) processor cores, and/or very long instruction word (VLIW) processor cores. In some examples, the executable machine-readable instructions 902 and/or the memory 906 is external to the DSP 900. In the illustrated example, the DSP 900 implements an RTOS and/or a basic input output system (BIOS) 908 in which a vertex shader (e.g., the example vertex shader 304) executes as a single task and/or single thread. To more efficiently execute the executable machine-readable instructions 902, the example DSP 900 may include cached memory (not shown) such as level 2 (L2) cached memory. To allow for efficient movement of data from an external memory 912 to an example L2 memory 910, the example DSP 900 of FIG. 9 includes a DMA channel 914 and a DMA channel 916.

In the illustrated example of FIG. 3, the DSP 900 implements the example vertex shader 304. In the illustrated example of FIG. 9, the incoming first data 512 (e.g., representing input vertices) is arranged according to the first format (see FIG. 6). However, such an arrangement of data is inefficient for a DSP such as the example DSP 900. For example, the DSP 900 has the capability to execute nested loops. GPUs typically cannot execute nested loops. Thus, the example DMA channel 914 of the DSP 900 is used to rearrange the incoming first data 512 from the first format 600 to the second format 700 (see FIG. 7). Because, for example, all data for a first attribute 702 (e.g., position data) is now stored together in the second format 700, three nested loops allow the data for the first attribute 702 to be efficiently processed for the X, Y and Z coordinates. Once the rearranged incoming second data 514 has been processed by the core(s) 904 (e.g., the vertex shader 304), the DMA 914 moves the shaded third data 516 to the first format, or any other desired format. Because the pre-processing and post-processing DMA operations can be pipelined with the data processing, as shown in an example pipelined configuration 1000 in FIG. 10, the pre-processing and post-processing do not increase processing time. In fact, the pre-processing and post-processing decrease processing time significantly.

Figure 10:
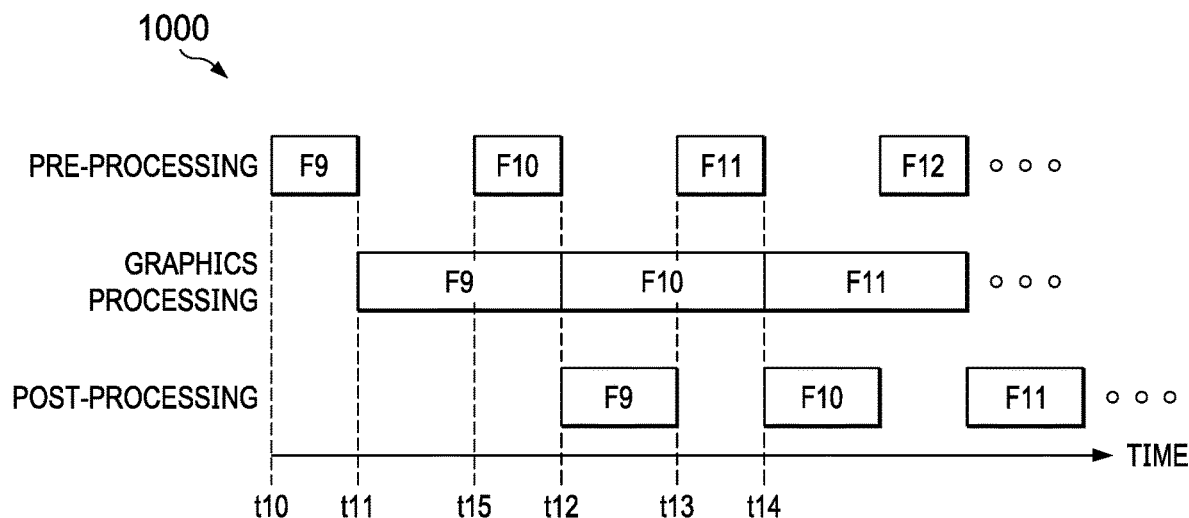
FIG. 10 is a diagram of an example pipelined configuration for the example DSPs of FIG. 3, FIG. 5, FIG. 8 and FIG. 9.

Example operations of the DSPs 302, 506, 812 and 900 can be efficiently implemented by using a pipelined configuration (e.g., pipelining) as shown as the example pipelined configuration 1000 of FIG. 10. In the illustrated example of FIG. 10, the DMA channel 914 pre-processes the incoming first data 512 in the first format (see FIG. 6) to form rearranged incoming second data 514 in the second format (see FIG. 7) for a frame F9 during a time period t10-t11, a DSP core 904 processes the rearranged incoming second data 514 to form shaded third data 516 for frame F9 during a time period t11-t12, and the DMA channel 915 post-processes the shaded third data 516 to form rearranged shaded fourth data 518 for frame F9 during a time period t12-t13 that overlaps a time period t12-t14 when the DSP core 904 processes frame F10. The DMA channel 914 pre-processes incoming fifth data in the first format to form rearranged incoming sixth data in the second format for a frame F10 during a time period t15-t12 that overlaps the DSP core 904 processing frame F9.

While an example DSP 900 that may be used to implement the example DSP 302 of FIG. 3, DSP 506 of FIG. 5 and/or the example DSP 812 is illustrated in FIG. 9, one or more of the elements, processes and/or devices illustrated in FIG. 9 may be combined, divided, re-arranged, omitted, eliminated and/or implemented in any other way. Further, the example DSP core(s) 904, the example memory 906, the example memory L2 memory 910, the example memory 912, the example RTOS and/or BIOS 908, the example DMA channel 914 the example DMA channel 916 and/or, more generally, the example DSP 900 of FIG. 9 may be implemented by hardware, software, firmware and/or any combination of hardware, software and/or firmware. Thus, for example, any of the example DSP core(s) 904, the example memory 906, the example memory L2 memory 910, the example memory 912, the example RTOS/BIOS 908, the example DMA channel 914, the example DMA channel 916 and/or, more generally, the example DSP 900 of FIG. 9 could be implemented by one or more analog or digital circuit(s), logic circuits, programmable processor(s), programmable controller(s), GPU(s), DSP(s), ASIC(s), PLD (s) and/or FPLD(s). When reading any of the apparatus or system claims of this patent to cover a purely software and/or firmware implementation, at least one of the DSP core(s) 904, the example memory 906, the example memory L2 memory 910, the example memory 912, the example RTOS/BIOS 908, the example DMA channels 914, the example DMA channel 916 and/or the example DSP 900 of FIG. 9 is/are hereby expressly defined to include a non-transitory computer-readable storage device or storage disk such as a memory, a DVD, a CD, a Blu-ray disk, etc. including the software and/or firmware. Further still, the example DSP 900 of FIG. 9 may include one or more elements, processes and/or devices in addition to, or instead of, those illustrated in FIG. 9, and/or may include more than one of any or all of the illustrated elements, processes and devices.

Figure 11:
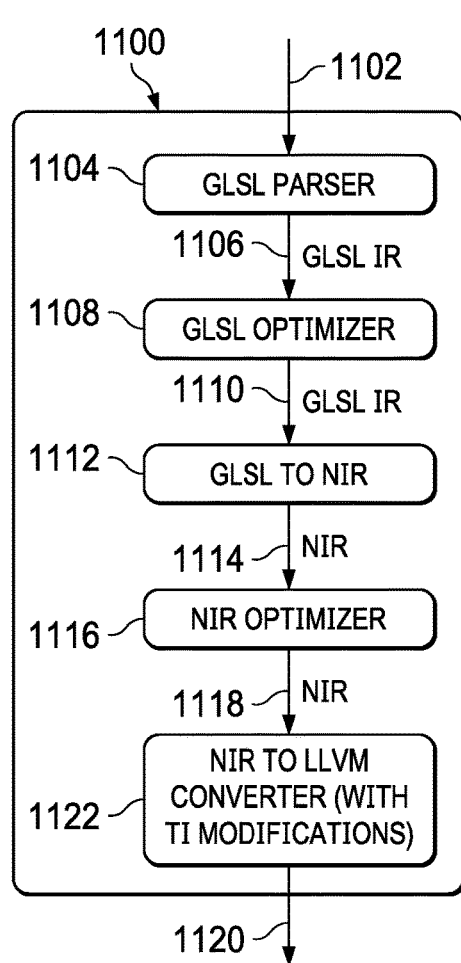
FIG. 11 is a block diagram of an example Low Level Virtual Machine (LLVM) intermediate representation (IR) creator according to teachings of this disclosure.

FIG. 11 is a block diagram of an example LLVM intermediate representation (LLVM IR) creator 1100 according to teachings of this disclosure. In some examples, the LLVM IR creator 1100 is implemented using The Mesa Project's open source implementation of the OpenGL specification. To parse software in the form of source code 1102 (e.g., for the example vertex shader 112 or 304) written in, for example, OpenGL source language (GLSL), the example LLVM IR creator 1100 includes an example GLSL parser 1104. The example GLSL parser 1104 of FIG. 11 processes the vertex shader source code string provided by glShaderSource for the GLSL and transforms the vertex shader source code 1102 into a suitable GLSL IR 1106 representation of the source code that is stored in memory and can be efficiently processed by later stages of a compilation process.

To optimize the GLSL IR 1106, the example LLVM IR creator 1100 includes an example GLSL optimizer 1108. The example GLSL optimizer 1108 of FIG. 11 re-writes constructs in the GLSL IR 1106 into optimized IR 1110 based on the underlying architecture of the DSP (e.g., execute more efficiently, faster, SIMD, VLIW, nested loops, etc.), including when the DSP hardware does not natively support a particular graphics processing function, operation, etc.

To convert the optimized IR 1110, the example LLVM IR creator 1100 includes an example GLSL to New Intermediate Representation (NIR) converter 1112. The example GLSL to NIR converter 1112 rewrites the optimized IR 1110 into NIR 1114 that is conducive to subsequent operations of the LLVM IR creator 1100. For example, the NIR 1114 is more efficient for optimizations and/or code generation by back-end tools of The Mesa Project.

To optimize the NIR 1114, the example LLVM IR creator 1100 includes an example NIR optimizer 1116. The example NIR optimizer 1116 of FIG. 11 re-writes constructs in the NIR into optimized NIR 1118 based on the underlying architecture of the DSP (e.g., execute more efficiently, faster, SIMD, VLIW, nested loops, etc.), including when the DSP hardware does not natively support a particular graphics processing function, operation, etc.

To create an LLVM IR 1120, the example LLVM IR creator 1100 includes an example NIR to LLVM converter 1122. The example NIR to LLVM converter 1122 rewrites the optimized NIR 1118 into LLVM IR 1120 based on the underlying architecture of the DSP (e.g., execute more efficiently, faster, SIMD, VLIW, nested loops, etc.), including when the DSP hardware does support a particular graphics processing function, operation, etc. that fits the underlying architecture of a DSP such as a DSP from the C6x family of DSPs by Texas Instruments. For example, in the illustrated example of FIG. 11, the converter 1122 uses load and/or store operations for shader storage variables to ensure uniform data. The converter 1122 maps NIR operations to DSP intrinsics, when feasible. The example converter 1122 replaces variable glLocalInvocationID with get_local_id( ) so the compiler backend (FIG. 12) can process the local invocation ID in the same manner as OpenCL kernels. In some examples, the converter handles unsized GLSL arrays.

While an example LLVM IR creator 1100 is illustrated in FIG. 11, one or more of the elements, processes and/or devices illustrated in FIG. 11 may be combined, divided, re-arranged, omitted, eliminated and/or implemented in any other way. Further, the example GLSL parser 1104, the example GLSL optimizer 1108, the example GLSL to NIR converter 1112, the example NIR optimizer 1116, the example NIR to LLVM converter 1122 and/or, more generally, the example LLVM IR creator 1100 of FIG. 11 may be implemented by hardware, software, firmware and/or any combination of hardware, software and/or firmware. Thus, for example, any of the example GLSL parser 1104, the example GLSL optimizer 1108, the example GLSL to NIR converter 1112, the example NIR optimizer 1116, the example NIR to LLVM converter 1122 and/or, more generally, the example LLVM IR creator 1100 could be implemented by one or more analog or digital circuit(s), logic circuits, programmable processor(s), programmable controller(s), GPU(s), DSP(s), ASIC(s), PLD(s) and/or FPLD(s). When reading any of the apparatus or system claims of this patent to cover a purely software and/or firmware implementation, at least one of the example GLSL parser 1104, the example GLSL optimizer 1108, the example GLSL to NIR converter 1112, the example NIR optimizer 1116, the example NIR to LLVM converter 1122 and/or the example LLVM IR creator 1100 is/are hereby expressly defined to include a non-transitory computer-readable storage device or storage disk such as a memory, a DVD, a CD, a Blu-ray disk, etc. including the software and/or firmware. Further still, the example LLVM IR creator 1100 of FIG. 11 may include one or more elements, processes and/or devices in addition to, or instead of, those illustrated in FIG. 11, and/or may include more than one of any or all of the illustrated elements, processes and devices.

Figure 12:
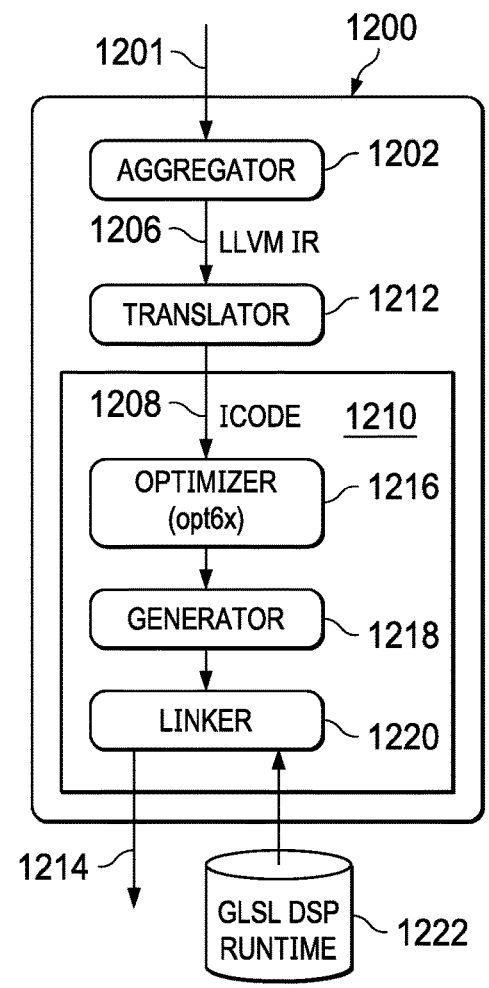
FIG. 12 is a block diagram of an example LLVM IR compiler according to teachings of this disclosure.

FIG. 12 is a block diagram of example an LLVM IR compiler 1200 to compile LLVM IR 1201 to machine-readable instructions executable by a DSP, according to teachings of this disclosure. To combine GLSL shading workgroups, the example LLVM IR compiler 1200 includes an example aggregator 1202. The example aggregator 1202 of FIG. 12 combines work groups (e.g., the smallest compute operations that a DSP can execute) for LLVM IR 1206 that are needed to be implement a graphics function such as the vertex shader 304.

To form code 1208 compilable and linkable by an example native toolset 1210 (e.g., native code compilation toolchain), such as the Open Computing Language (OpenCL) toolset developed by Texas Instruments for the C6x family of DSPs, the example LLVM IR compiler 1200 includes an example translator 1212. In the illustrated example, the translator 1212 converts the LLVM IR into ICODE IR for compilers developed by Texas Instruments.

To compile the code 1208 to form executable machine-readable instructions 1214 for a DSP, the example LLVM IR compiler 1200 includes the example native toolset 1210. In some examples, the native toolset 1210 is a commercially available toolset such as that developed by OpenCL toolchain developed by Texas Instruments for the C6x family of DSPs. In the illustrated example, the native toolset 1210 includes an optimizer 1216, a code generator 1218 and a linker 1220. The linker 1220 links in binaries from a GLSL DSP runtime library 1222 with the executable machine-readable instructions generated by the example code generator 1218.

While tools from The Mesa Project are used in the examples of FIGS. 11 and 12, other tools could alternatively, and/or additionally, be used to convert graphics software to LLVM and machine-readable instructions executable by a DSP. For example, tools from the Kronos Group (e.g., the Kronos GSL compiler, the Kronos Standard Portable Intermediate Representation-Vulcan (SPIR-V) to LLVM converter, etc.) could be used with the OpenCL toolset developed by Texas Instruments for the C6x family of DSPs discussed above in connection with FIG. 12 could be used.

While an example LLVM IR compiler 1200 is illustrated in FIG. 12, one or more of the elements, processes and/or devices illustrated in FIG. 12 may be combined, divided, re-arranged, omitted, eliminated and/or implemented in any other way. Further, the example aggregator 1202, the example translator 1212, the example toolset 1210, the example optimizer 1216, the example code generator 1218, the example linker 1220 and/or, more generally, the example LLVM IR compiler 1200 of FIG. 12 may be implemented by hardware, software, firmware and/or any combination of hardware, software and/or firmware. Thus, for example, any of the example aggregator 1202, the example translator 1212, the example toolset 1210, the example optimizer 1216, the example code generator 1218, the example linker 1220 and/or, more generally, the example LLVM IR compiler 1200 of FIG. 12 could be implemented by one or more analog or digital circuit(s), logic circuits, programmable processor(s), programmable controller(s), GPU(s), DSP(s), ASIC(s), PLD(s) and/or FPLD(s). When reading any of the apparatus or system claims of this patent to cover a purely software and/or firmware implementation, at least one of the example aggregator 1202, the example translator 1212, the example toolset 1210, the example optimizer 1216, the example code generator 1218, the example linker 1220 and/or the example LLVM IR compiler 1200 of FIG. 12 is/are hereby expressly defined to include a non-transitory computer-readable storage device or storage disk such as a memory, a DVD, a CD, a Blu-ray disk, etc. including the software and/or firmware. Further still, the example LLVM IR compiler 1200 of FIG. 12 may include one or more elements, processes and/or devices in addition to, or instead of, those illustrated in FIG. 12, and/or may include more than one of any or all of the illustrated elements, processes and devices.

Figure 13:
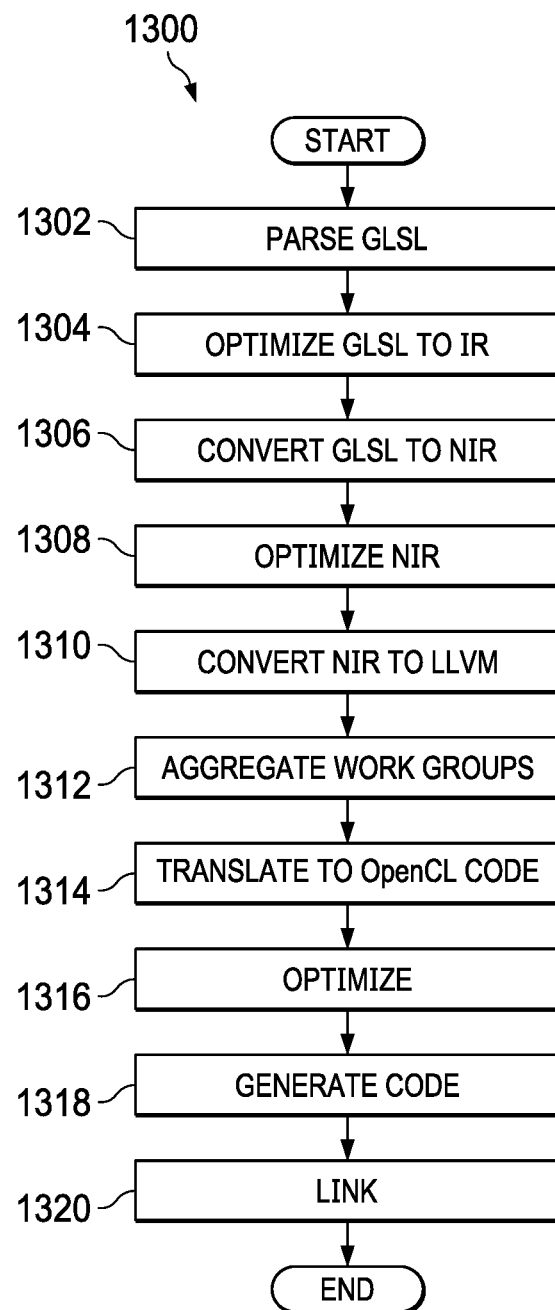
FIG. 13 is a flowchart representative of example hardware logic or machine-readable instructions for implementing the LLVM IR creator of FIG. 11 and the LLVM IR compiler of FIG. 12.

A flowchart 1300 representative of example hardware logic, machine-readable instructions, hardware implemented state machines, and/or any combination thereof for implementing the example LLVM IR creator 1100 of FIG. 11 and the example LLVM IR compiler 1200 of FIG. 12 is shown in FIG. 13. The machine-readable instructions may be an executable program or portion of an executable program for execution by a computer processor such as the processor 1610 shown in the example processor platform 1600 discussed below in connection with FIG. 13. The program may be embodied in software stored on a non-transitory computer-readable storage medium such as a compact disc read-only memory (CD-ROM), a floppy disk, a hard drive, a DVD, a Blu-ray disk, or a memory associated with the processor 1610, but the entire program and/or parts thereof could alternatively be executed by a device other than the processor 1610 and/or embodied in firmware or dedicated hardware. Further, although the example program is described with reference to the flowchart illustrated in FIG. 13, many other methods of implementing the example LLVM IR creator 1100 of FIG. 11 and the example LLVM IR compiler 1200 of FIG. 12 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 13 may be implemented using executable instructions (e.g., computer and/or machine-readable instructions) stored on a non-transitory computer and/or machine-readable medium such as a hard disk drive, a flash memory, a read-only memory, a CD-ROM, a DVD, a cache, a random-access memory (RAM) and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The example program of FIG. 13 begins with GLSL being parsed by processing the vertex shader source code string provided by glShaderSource for the GLSL and transforms the vertex shader source code into a suitable GLSL IR 1106 representation of the source code that is stored in memory and can be efficiently processed by later stages of a compilation process (block 1302).

The GLSL is optimized to IR by re-writing constructs in the GLSL IR 1106 into optimized IR 1110 based on the underlying architecture of the DSP (e.g., execute more efficiently, faster, SIMD, VLIW, nested loops, etc.), including when the DSP hardware does support a particular graphics processing function, operation, etc. (block 1304)

The optimized IR is converted into NIR 1114 that is conducive to subsequent operations of the LLVM IR creator 1100. For example, the NIR 1114 is more efficient for optimizations and/or code generation by back-end tools of The Mesa Project (block 1306).

The NIR is optimized by rewriting constructs in the NIR into optimized NIR 1118 based on the underlying architecture of the DSP (e.g., execute more efficiently, faster, SIMD, VLIW, nested loops, etc.), including when the DSP hardware does support a particular graphics processing function, operation, etc. (block 1308).

LLVM IR is created by rewriting the optimized NIR 1118 into LLVM IR 1120 based on the underlying architecture of the DSP (e.g., execute more efficiently, faster, SIMD, VLIW, nested loops, etc.), including when the DSP hardware does support a particular graphics processing function, operation, etc. that fits the underlying architecture of a DSP such as a DSP from the C6x family of DSPs by Texas Instruments (block 1310).

GLSL shading workgroups are aggregated by combining together work groups (e.g., the smallest compute operations that a DSP can execute) for LLVM IR 1204 that are needed to be implement a graphics function such as the vertex shader 304 (block 1312).

The aggregated workgroups are translated into coded that is compilable and linkable by a native toolset such as the OpenCL toolset developed by Texas Instruments for the C6x family of DSPs, the example LLVM IR compiler 1200 includes an example translator 1212 (block 1314).

The translated code is optimized (block 1316), compiled (block 1318) and linked (block 1320) using the native toolset. Control then exits from the example program of FIG. 13.

FIGS. 14 and 15 show example performance results achieved using teachings of this disclosure. The example table 1400 of FIG. 14 shows the billions of floating point operations per second (GFLOPs) achievable by a first example SoC device 1402 and a second example SoC device 1404. The example SoC device 1402 includes two GPU cores of a first variety (GPU1) and two DSP cores of a first variety (DSP1). The SoC device 1404 includes two GPU cores of a second variety (GPU2) and two DSP cores of a second variety (DSP2). As shown for the example SoC device 1402, the inclusion of the DSPs provides a 37% increase in GFLOPs. Because the area required to implement two DSP cores DSP2 is smaller than adding another GPU1 core, the use of the DSP cores DSP1 provides a more efficient method to increase GFLOPs compared to adding another GPU1 core.

Figure 16:
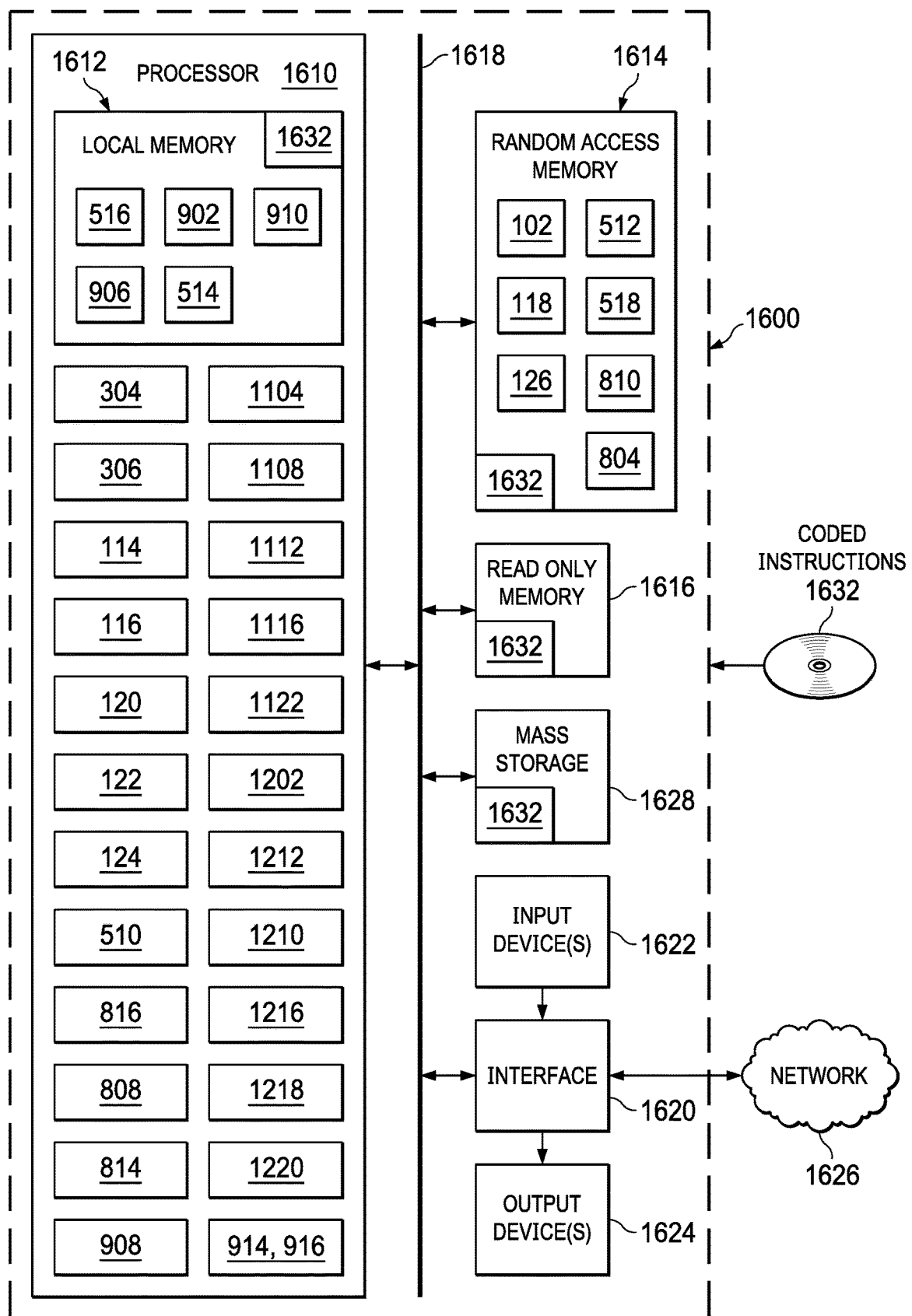
FIG. 16 illustrates an example processor platform structured to execute the example machine-readable instructions of FIG. 13 to implement the example DSPs of FIG. 3, FIG. 5, FIG. 8 and/or FIG. 9, and the code creator of FIG. 11 and the code compiler of FIG. 12.

An example table 1500 shown in FIG. 15 shows the number of cycles 1502 to implement different vertex shaders 1504 on a C66x DSP core 1506 versus a SGX544 GPU core 1508. While, the C66x DSP core 1506 often requires more cycles per function, they do FIG. 16 is a block diagram of an example processor platform 1600 structured to execute the instructions of FIG. 13 to implement the example LLVM IR creator 1100 of FIG. 11 and the example LLVM IR compiler 1200 of FIG. 12, and/or implement the example DSP 302, DSP 506, DSP 812, and DSP 900 of FIGS. 3, 5, 8 and 9, respectively. The processor platform 1600 can be, for example, an SoC, a server, a personal computer, a workstation, a self-learning machine (e.g., a neural network), a mobile device (e.g., a cell phone, a smart phone, a tablet such as an IPAD™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1600 of the illustrated example includes a processor 1610. The processor 1610 of the illustrated example is hardware. For example, the processor 1610 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example program of FIG. 13, vertex shader 304, the application(s) 510, the GPU driver 808, the DSP driver 814, the RTOS 816, the RTOS/BIOS 908, the GLSL parser 1104, the GLSL optimizer 1108, the GLSL to NIR converter 1112, the NIR optimizer 1116, the NIR to LLVM converter 1122, the aggregator 1202, the translator 1212, the native toolset 1210, the optimizer 1216, the code generator 1218, and the linker 1220.

The processor 1610 of the illustrated example includes a local memory 1612 (e.g., a cache). In the illustrated example, the memory 1612 implements/stores the memory 906 and the memory 910. The processor 1610 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1616 may be implemented by flash memory and/or any other desired type of memory device. Access to the main memory 1614, 1616 is controlled by a memory controller. In the illustrated example, the main memory 1614, 1616 stores/implements the vertices 102, the memory 508, the incoming first data 512, the rearranged incoming second data 514, the shaded third data 516 and the rearranged shaded fourth data 518, the memory 910, the memory 912, the GPU libraries 804 and the DSP libraries 810.

The processor platform 1600 of the illustrated example also includes an interface circuit 1620. The interface circuit 1620 may be implemented by any type of interface standard, such as an Ethernet interface, a universal serial bus (USB), a Bluetooth® interface, a near field communication (NFC) interface, and/or a peripheral component interconnect (PCI) express interface.

In the illustrated example, one or more input devices 1622 are connected to the interface circuit 1620. The input device(s) 1622 permit(s) a user to enter data and/or commands into the processor 1610. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speaker. The interface circuit 1620 of the illustrated example, thus, typically includes a graphics driver card, a graphics driver chip and/or a graphics driver processor.

The interface circuit 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1626. The communication can be via, for example, an Ethernet connection, a digital subscriber line (DSL) connection, a telephone line connection, a coaxial cable system, a satellite system, a line-of-site wireless system, a cellular telephone system, etc. In some examples of a Wi-Fi system, the interface circuit 1620 includes a radio frequency (RF) module, antenna(s), amplifiers, filters, modulators, etc.

The processor platform 1600 of the illustrated example also includes one or more mass storage devices 1628 for storing software and/or data. Examples of such mass storage devices 1628 include floppy disk drives, hard drive disks, CD drives, Blu-ray disk drives, redundant array of independent disks (RAID) systems, and DVD drives.

Coded instructions 1632 including the coded instructions of FIG. 13 may be stored in the mass storage device 1628, in the volatile memory 1614, in the non-volatile memory 1616, and/or on a removable non-transitory computer-readable storage medium such as a CD-ROM or a DVD.

From the foregoing, it will be appreciated that example methods, apparatus and articles of manufacture have been disclosed that perform graphics processing on combinations of graphic processing units and digital signal processors. From the foregoing, it will be appreciated that methods, apparatus and articles of manufacture are disclosed that enhance the operation of electronic devices by augmenting graphics processing capability with DSPs, which can be implemented in less integrated circuit die area than GPUs, thereby allowing more graphics processing capability to be implemented in an electronic device without incurring a penalty in size, power consumption, etc. if an additional GPU were used. The teachings of this disclosure can be used with existing native toolsets, obviating the need to develop custom code generation tools. Further, the teachings of this disclosure can be used to combine a DSP with any GPU. Furthermore, any DSP may be used.

Example methods, apparatus, and articles of manufacture to perform graphics processing on combinations of graphic processing units and digital signal processors are disclosed herein. Further examples and combinations thereof include at least the following.

Example 1 includes a non-transitory computer-readable storage medium comprising first machine-readable instructions that, when executed, cause a machine to at least access, from a memory of a graphics processing unit (GPU), first data representing input vertices, the first data using a first format organized by vertex, process the first data to create second data, the second data using a second format organized by components of the vertices, cause a digital signal processor (DSP) to perform vertex shading on the second data to create third data, the third data formatted using the second format, the vertex shading performed by executing a first instruction at the DSP, the first instruction generated based on a second instruction capable of being executed at the GPU, and process the third data to create fourth data, the fourth data formatted using the first format.

Example 2 includes the non-transitory computer-readable storage medium of example 1, wherein the first machine-readable instructions, when executed, cause the machine to process the first data, perform the vertex shading on the second data, and process the third data in at least one of a single task or a single thread in a real-time operating system on the DSP.

Example 3 includes the non-transitory computer-readable storage medium of example 1, wherein the memory is a first memory, the first format includes first attributes of a first vertex stored together in the first memory, followed by second attributes of a second vertex stored together in the first memory, and the second format includes first attributes of the input vertices stored together in a second memory, followed by second attributes of the input vertices together in the second memory.

Example 4 includes the non-transitory computer-readable storage medium of example 1, wherein the second instruction capable of being executed by the GPU is converted to the first instruction by compiling the second instruction to an LLVM intermediate representation, and compiling the LLVM intermediate representation to the first instruction for the DSP using a native code compilation toolchain for the DSP.

Example 5 includes the non-transitory computer-readable storage medium of example 4, wherein the processing of the first data and the processing of the third data is transparent to the compiling of the software to the LLVM intermediate representation.

Example 6 includes a method comprising processing first data representing input vertices to create second data, the first data using a first format organized by vertex, the second data using a second format organized by components of the vertices, causing a digital signal processor (DSP) to perform vertex shading on the second data to create third data, the third data formatted using the second format, the vertex shading performed by executing a first instruction at the DSP, the first instruction generated based on a second instruction capable of being executed at a graphics processing unit (GPU), and processing the third data to create fourth data, the fourth data formatted using the first format.

Example 7 includes the method of example 1, further including accessing the first data from a memory in which the GPU is to write the first data, and outputting the fourth data to the memory from which the GPU is to read the fourth data.

Example 8 includes the method of example 6, wherein the processing of the first data, the performance of the vertex shading on the second data, and the processing of the third data is performed as at least one of a single task or a single thread in a real-time operating system on the DSP.

Example 9 includes the method of example 6, wherein the first data is a subset of vertices to be shaded.

Example 10 includes the method of example 9, wherein a number of input vertices in the subset is based on an amount of memory available in the DSP.

Example 11 includes the method of example 6, wherein the first format includes first attributes of a first vertex stored together in a memory, followed by second attributes of a second vertex stored together in the memory.

Example 12 includes the method of example 6, wherein the second format includes first attributes of the input vertices stored together in a memory, followed by second attributes of the input vertices stored together in the memory.

Example 13 includes the method of example 6, wherein the second instruction is converted to first instruction by compiling the second instruction to an LLVM intermediate representation, and compiling the LLVM intermediate representation to the first instruction for execution by the DSP using a native code compilation toolchain for the DSP.

Example 14 includes the method of example 13, wherein the processing of the first data is transparent to the compiling of the software to the LLVM intermediate representation.

Example 15 includes the method of example 6, wherein the DSP includes at least one of a single instruction multiple data (SIMD) processor or a very long instruction word (VLIW) processor.

Example 16 includes the method of example 6, wherein the vertex shader on the DSP is part of an application for an automobile.

Example 17 includes a system for performing a graphics application, the system comprising a memory, a graphics processing unit (GPU), and a digital signal processor (DSP) to process first data representing input vertices stored in the memory by the GPU, the first data using a first format organized based on vertices to second data stored according to a second format organized based on components of vertices, perform vertex shading on the second data to create third data, the third data formatted using the second format, the vertex shading to be performed by executing a first instruction at the DSP, the first instruction generated based on a second instruction capable of being executed at the GPU, and process the third data to create fourth data, the fourth data formatted using the first format, the fourth data to be stored in the memory.

Example 18 includes the system of example 17, wherein the GPU is to perform a first graphics processing function to generate the first data, and perform a second graphics processing function on the fourth data.

Example 19 includes the system of example 17, wherein the DSP is to process the first data, perform the vertex shading, and process the third data in at least one of a single task or a single thread in a real-time operating system on the DSP.

Example 20 includes the system of example 17, wherein the memory is a first memory, the first format includes first attributes of a first vertex stored together the first memory of the DSP, followed by second attributes of a second vertex stored together in the first memory, and the second format includes first attributes of the input vertices stored together in a second memory, followed by second attributes of the input vertices together in the second memory.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A non-transitory computer-readable storage medium comprising first machine-readable instructions that, when executed, cause a machine to at least:
    access, from a memory of a graphics processing unit (GPU), first data representing input vertices, the first data using a first format organized by vertex;
    process the first data to create second data, the second data using a second format organized by components of the vertices;
    cause a digital signal processor (DSP) to perform vertex shading on the second data to create third data, the third data formatted using the second format, the vertex shading performed by executing a first instruction at the DSP, the first instruction generated based on a second instruction capable of being executed at the GPU; and
    process the third data to create fourth data, the fourth data formatted using the first format.

2. The non-transitory computer-readable storage medium of claim 1, wherein the first machine-readable instructions, when executed, cause the machine to process the first data, perform the vertex shading on the second data, and process the third data in at least one of a single task or a single thread in a real-time operating system on the DSP.

3. The non-transitory computer-readable storage medium of claim 1, wherein:
    the memory is a first memory;
    the first format includes first attributes of a first vertex stored together in the first memory, followed by second attributes of a second vertex stored together in the first memory; and
    the second format includes first attributes of the input vertices stored together in a second memory, followed by second attributes of the input vertices together in the second memory.

4. The non-transitory computer-readable storage medium of claim 1, wherein the second instruction capable of being executed by the GPU is converted to the first instruction by:
    compiling the second instruction to an LLVM intermediate representation; and
    compiling the LLVM intermediate representation to the first instruction for the DSP using a native code compilation toolchain for the DSP.

5. The non-transitory computer-readable storage medium of claim 4, wherein the processing of the first data and the processing of the third data is transparent to the compiling of the software to the LLVM intermediate representation.

6. The method of claim 1, further including:
    accessing the first data from a memory in which the GPU is to write the first data; and
    outputting the fourth data to the memory from which the GPU is to read the fourth data.

7. A method comprising:
    processing first data representing input vertices to create second data, the first data using a first format organized by vertex, the second data using a second format organized by components of the vertices;
    causing a digital signal processor (DSP) to perform vertex shading on the second data to create third data, the third data formatted using the second format, the vertex shading performed by executing a first instruction at the DSP, the first instruction generated based on a second instruction capable of being executed at a graphics processing unit (GPU); and
    processing the third data to create fourth data, the fourth data formatted using the first format.

8. The method of claim 7, wherein the processing of the first data, the performance of the vertex shading on the second data, and the processing of the third data is performed as at least one of a single task or a single thread in a real-time operating system on the DSP.

9. The method of claim 7, wherein the first data is a subset of vertices to be shaded.

10. The method of claim 9, wherein a number of input vertices in the subset is based on an amount of memory available in the DSP.

11. The method of claim 7, wherein the first format includes first attributes of a first vertex stored together in a memory, followed by second attributes of a second vertex stored together in the memory.

12. The method of claim 7, wherein the second format includes first attributes of the input vertices stored together in a memory, followed by second attributes of the input vertices stored together in the memory.

13. The method of claim 7, wherein the second instruction is converted to first instruction by:
    compiling the second instruction to an LLVM intermediate representation; and
    compiling the LLVM intermediate representation to the first instruction for execution by the DSP using a native code compilation toolchain for the DSP.

14. The method of claim 13, wherein the processing of the first data is transparent to the compiling of the software to the LLVM intermediate representation.

15. The method of claim 7, wherein the DSP includes at least one of a single instruction multiple data (SIMD) processor or a very long instruction word (VLIW) processor.

16. The method of claim 7, wherein the vertex shader on the DSP is part of an application for an automobile.

17. A system for performing a graphics application, the system comprising:
    a memory;
    a graphics processing unit (GPU); and
    a digital signal processor (DSP) to:
        process first data representing input vertices stored in the memory by the GPU, the first data using a first format organized based on vertices to second data stored according to a second format organized based on components of vertices;
        perform vertex shading on the second data to create third data, the third data formatted using the second format, the vertex shading to be performed by executing a first instruction at the DSP, the first instruction generated based on a second instruction capable of being executed at the GPU; and
        process the third data to create fourth data, the fourth data formatted using the first format, the fourth data to be stored in the memory.

18. The system of claim 17, wherein the GPU is to:
    perform a first graphics processing function to generate the first data; and perform a second graphics processing function on the fourth data.

19. The system of claim 17, wherein the DSP is to process the first data, perform the vertex shading, and process the third data in at least one of a single task or a single thread in a real-time operating system on the DSP.

20. The system of claim 17, wherein:
the memory is a first memory;
the first format includes first attributes of a first vertex stored together the first memory of the DSP, followed by second attributes of a second vertex stored together in the first memory; and
the second format includes first attributes of the input vertices stored together in a second memory, followed by second attributes of the input vertices together in the second memory.

* * * * *